United States Patent
Zhao et al.

(10) Patent No.: US 11,808,838 B2
(45) Date of Patent: Nov. 7, 2023

(54) MOTION STATE DETECTION APPARATUS AND METHOD BASED ON WIRELESS SIGNALS AND SYSTEM

(71) Applicant: Fujitsu Limited, Kawasaki (JP)

(72) Inventors: Qian Zhao, Beijing (CN); Jun Tian, Beijing (CN); Hongchun Li, Beijing (CN); Genming Ding, Beijing (CN); Lili Xie, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 533 days.

(21) Appl. No.: 16/774,321

(22) Filed: Jan. 28, 2020

(65) Prior Publication Data

US 2020/0309940 A1    Oct. 1, 2020

(30) Foreign Application Priority Data

Mar. 29, 2019    (CN) .......................... 201910249161.7

(51) Int. Cl.
*G01S 13/62*    (2006.01)
(52) U.S. Cl.
CPC ................... *G01S 13/62* (2013.01)
(58) Field of Classification Search
CPC ........................................................ G01S 13/62
See application file for complete search history.

(56) References Cited

U.S. PATENT DOCUMENTS

| 2012/0146796 A1* | 6/2012 | Margon | ................... | A61B 5/05 340/573.1 |
| 2016/0377704 A1* | 12/2016 | Harash | ................ | G01S 13/0209 342/21 |
| 2019/0020425 A1 | 1/2019 | Zhang et al. | | |
| 2019/0087009 A1* | 3/2019 | Rao | .......................... | G01S 7/352 |
| 2019/0265345 A1* | 8/2019 | Jungmaier | ............. | H04R 1/342 |
| 2020/0191943 A1* | 6/2020 | Wu | ........................ | G01S 13/726 |
| 2021/0279549 A1* | 9/2021 | Spanos | ................... | G01S 7/412 |

(Continued)

FOREIGN PATENT DOCUMENTS

| CN | 102288963 | | 12/2011 |
| CN | 104951757 | A | 9/2015 |
| CN | 105488798 | | 4/2016 |

(Continued)

OTHER PUBLICATIONS

Chen Min-gang, "Research on Activity Recognition Based Radar System", College of Physics and Optoeletronics, Taiyuan University of Technology, Taiyuan 030024, China, Coal Technology, vol. 37 No. 8, Aug. 2018.
Extended European Search Report dated Aug. 5, 2020 in European Patent Application No. 20152410.5.
Michael Ulrich et al., "Person Recognition Based on Micro-Doppler and Thermal Infrared Camera Fusion for Firefighting", 2018 21$^{st}$ International Conference on Information Fusion (FUSION), Jul. 10, 2018, pp. 919-926, XP033398027.

(Continued)

*Primary Examiner* — Timothy A Brainard
*Assistant Examiner* — Hailey R Le
(74) *Attorney, Agent, or Firm* — STAAS & HALSEY LLP (57) ABSTRACT

Embodiments of this disclosure provide a motion state detection apparatus and method based on wireless signals and a system, in which variations of energy distribution of reflection points with time are calculated according to wireless signals reflected from a space where an object that is detected is located, and a motion state of the object is determined according to the variations. Thus, the training of the recognition model is not needed, the detection process is simple and detection results are reliable, and are applicable to various different application scenarios.

8 Claims, 5 Drawing Sheets

(56) References Cited

U.S. PATENT DOCUMENTS

2022/0053295 A1* 2/2022 Ghourchian .......... G01S 13/765

FOREIGN PATENT DOCUMENTS

| CN | 105629233 | | 6/2016 |
|----|-----------|---|--------|
| CN | 107171749 | A | 9/2017 |
| CN | 107490795 | A | 12/2017 |
| CN | 108020813 | A | 5/2018 |
| CN | 108652601 | | 10/2018 |
| CN | 108828548 | | 11/2018 |
| CN | 109154649 | A | 1/2019 |
| EP | 2 952 926 | A1 | 12/2015 |
| JP | 8-117227 | | 5/1996 |
| JP | 2013-117866 | | 6/2013 |
| JP | 2016-217992 | | 12/2016 |
| WO | WO 2017/193200 | A1 | 11/2017 |
| WO | 2018/094502 | | 5/2018 |

OTHER PUBLICATIONS

Yong Wang et al., "TS-I3D Based Gesture Recognition Method With Sensor", IEEE Access, vol. 7, Feb. 4, 2019, pp. 22902-22913, XP011712075.

Pavlo Molchanov et al., "Short-range FMCW Monopulse Radar For Hand-Gesture Sensing", 2015 IEEE Radar Conference (RADARCON), IEEE, May 10, 2015, pp. 1491-1496, XP032788560.

Piyali Goswami et al., "Real-Time Multi-Gesture Recognition using 77 GHz FMCW MIMO Single Chip Radar", 2019 IEEE International Conference on Consumer Electronics (ICCE). IEEE, Jan. 11, 2019, pp. 1-4, XP033528132.

Office Action dated Mar. 14, 2023 in European Patent Application No. 20 152 410.5 (6 pages).

Office Action dated Aug. 19, 2023 in Chinese Patent Application No. 201910249161.7.

Office Action dated Aug. 29, 2023 in Japanese Patent Application No. 2020-013219.

* cited by examiner

MOTION STATE DETECTION APPARATUS AND METHOD BASED ON WIRELESS SIGNALS AND SYSTEM

CROSS-REFERENCE TO RELATED APPLICATIONS

This application is based on and hereby claims priority to Chinese Application No. 201910249161.7, filed Mar. 29, 2019, in the State Intellectual Property Office of China, the disclosure of which is incorporated herein by reference.

TECHNICAL FIELD

This disclosure relates to the field of information technologies, and in particular to a motion state detection apparatus and method based on wireless signals and a system.

BACKGROUND

In recent years, motion state detection has been widely used in various fields. For example, human motion state detection has a wide range of applications in the fields of medical health, intelligent care, and motion capture, etc. At present, the aging trend of society is intensifying, and the number of elderly people living alone has increased dramatically. Providing dangerous motion state detection services for the elderly people may timely alert and provide assistance when dangers occur, so it is of great significance.

Human body motion state detection may be based on video images or based on information collected by a wearable device integrated with an inertial measurement unit (IMU). However, the human body motion state detection based on video images is likely to violate the privacy of the detection object, and the detection of the human motion state based on the wearable device requires that the detection object always wears the device, which is inconvenient to use and the recognition accuracy is not high. For example, for environments such as bathrooms or toilets, it is necessary to monitor the state of motion of the human body, but the recognition method based on video images obviously violates personal privacy, and the recognition method based on the wearable device causes inconvenience due to a need to wear the devices.

In order to solve the above-mentioned problem, a method for detecting a human body motion state based on a wireless signal has appeared. For example, this method recognizes actions by collecting wireless signals reflected by a detection object.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Embodiments of this disclosure provide an apparatus for a motion state detection and method thereof based on wireless signals and a system, in which variations of energy distribution of reflection points with time are calculated according to wireless signals reflected from a space where an object that is detected is located, and a motion state of the object is determined according to the variations. Thus, the training of the recognition model is not needed, the detection process is simple and detection results are reliable, and are applicable to various different application scenarios.

According to an embodiment of this disclosure, there is provided an apparatus for a motion state detection based on wireless signals, the apparatus including a memory and a processor. The processor is configured to calculate variations of energy distribution of reflection points with time according to wireless signals reflected from a space where an object that is detected is located; and determine a motion state of the object according to the calculated variations of energy distribution of reflection points with time.

According to an embodiment of this disclosure, there is provided a motion state detection system, including: a signal transmitter configured to transmit wireless signals to a space where an object that is detected is located; a signal receiver configured to receive wireless signals reflected; and the motion state detection apparatus based on wireless signals as described herein to detect a motion state of the object according to received wireless signals which are reflected from the space where the object is located.

According to an embodiment of this disclosure, there is provided a motion state detection method based on wireless signals, the method including: calculating variations of energy distribution of reflection points with time according to wireless signals reflected from a space where an object that is detected is located: and determining a motion state of the object according to the calculated variations of energy distribution of reflection points with time.

An advantage of the embodiments of this disclosure exists in that variations of energy distribution of reflection points with time are calculated according to wireless reflection signals from a space where an object that is detected is located, and a motion state of the object is determined according to the variations. Thus, the training of the recognition model is not needed, the detection process is simple and detection results are reliable, and are applicable to various different application scenarios.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that existing wireless signal-based human motion state detection methods are usually based on supervised learning methods, which need a large number of samples to train the recognition model, and are less applicable in different scenarios. Therefore, a training process of the recognition model needed in such methods is relatively complex, and such methods are not universally applicable to different scenarios.

Embodiment 1

Figure 1:
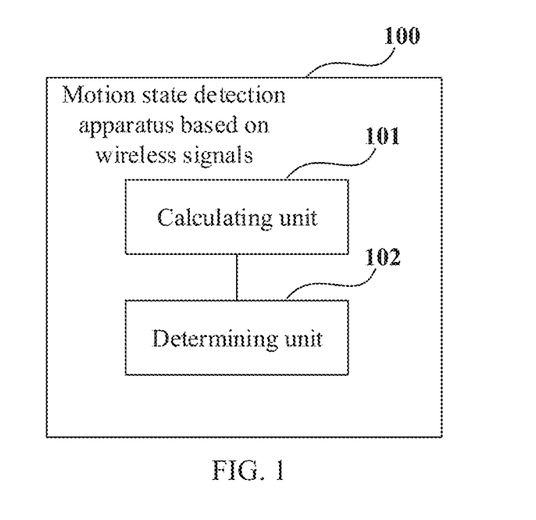
FIG. 1 is a schematic diagram of the motion state detection apparatus based on wireless signals according to an embodiment of this disclosure.

This embodiment provides a motion state detection apparatus based on wireless signals. FIG. 1 is a schematic diagram of the motion state detection apparatus based on wireless signals of Embodiment 1 of this disclosure. As shown in FIG. 1, a motion state detection apparatus 100 based on wireless signals includes:

a calculating unit 101 configured to calculate variations of energy distribution of reflection points with time according to wireless reflection signals from a space where a detection object is located; and a determining unit 102 configured to determine a motion state of the detection object according to the variations of energy distribution of reflection points with time.

It can be seen from the above embodiment that the variations of energy distribution of the reflection points with time are calculated according to the wireless reflection signals from the space where the detection object is located, and the motion state of the detection object is determined according to the variations. Thus, the training of the recognition model is not needed, the detection process is simple and detection results are reliable, and are applicable to various different application scenarios.

In this embodiment, the detection object may be various objects that may be in a moving state, such as a living body. In this embodiment, description shall be given by taking a human body as an example.

In this embodiment, the calculating unit 101 calculates the variations of energy distribution of the reflection points with time according to the wireless reflection signals from the space where the detection object is located.

In this embodiment, the wireless signals may be various wireless signals, such as a microwave radar signal.

For example, in detecting the detection object, a wireless signal generating device emits wireless signals to the space where the detection object is located, in which a part of the wireless signals are reflected by the detection object and other objects. Points reflecting the wireless signals are referred to as reflection points.

In this embodiment, the energy of the reflection points characterizes energy of the reflection signals reflected from the reflection points, for example, the energy of the reflection points is a square of an amplitude of one-dimensional Fourier transform of a corresponding reflection signals.

For example, a distance-Fourier transform graph of the reflection signals may be obtained by transforming one-dimensional Fourier transform on the reflection signals. The abscissa of the graph is the distance between the detection object and the wireless signal transmission source, the ordinate is the amplitude of the one-dimensional Fourier transform, and the square of the amplitude is the energy of the reflection points.

Furthermore, a Doppler-Fourier transform graph of the reflection signals may be obtained by performing two-dimensional Fourier transform on the reflection signals. The abscissa of the graph is the distance between the detection object and the wireless signal transmission source, and the ordinate is the amplitude of the two-dimensional Fourier transform.

Moreover, according to the distance-Fourier transform graph and Doppler-Fourier transform graph of the reflection signals, a distance-Doppler spectrum graph of the reflection signals may be obtained, the abscissa being the distance between the detection object and the wireless signal transmission source, and ordinate being a moving speed of the detection object.

In this embodiment, the energy distribution of the reflection points may be distribution of the energy of the reflection points relative to various parameters. For example, the energy distribution of the reflection points may be the energy distribution of the reflection points relative to at least one of position information of the detection object and the moving speed of the detection object.

In this embodiment, the position information of the detection object may be various information indicating the position of the detection object, such as the distance between the detection object and the wireless signal transmission source, or coordinates of the position where the detection object is located in a coordinate system established with the wireless signal transmission source as a center, such as three-dimensional coordinates. In this embodiment, description is given by taking the distance between the detection object and the wireless signal transmission source as an example; however, a particular content of the position information is not limited thereto.

In this embodiment, the variations of energy distribution of reflection points with time may be measured by a difference or similarity between the distributions at at least two different moments. For example, the variations of energy distribution of reflection points with time is measured by the similarity between the distributions at two moments.

In this embodiment, the two moments are, for example, a first moment and a second moment, respectively. The first moment and the second moment may be two consecutive moments, or two moments with an interval therebetween. In addition, the first moment or the second moment may be a current moment.

In this embodiment, the two moments may include the preset number of frames, respectively. For example, both the first moment and the second time include five consecutive frames.

In this embodiment, it is aimed at all reflection points or reflection points with energies greater than a second threshold when the calculating unit 101 calculates the variations of the energy distribution of the reflection points with time. The second threshold may be set according to an actual situation.

A method for calculating the of the energy distribution of the reflection points with time by the calculating unit 101 shall be illustrated below.

Figure 2:
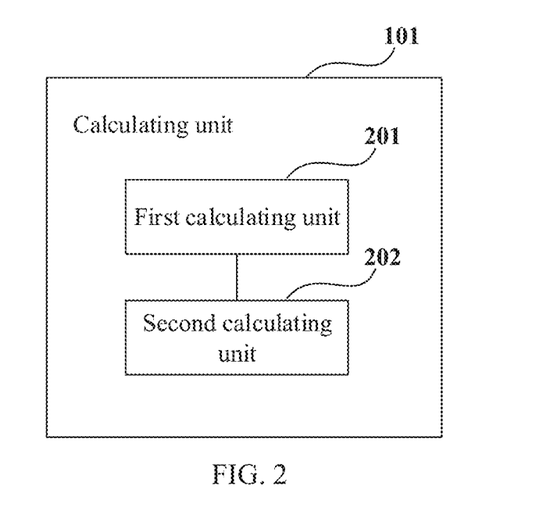
FIG. 2 is a schematic diagram of the calculating unit according to an embodiment of this disclosure.

FIG. 2 is a schematic diagram of the calculating unit of Embodiment 1 of this disclosure. As shown in FIG. 2, the calculating unit 101 includes:

a first calculating unit 201 configured to calculate distribution of energies of the reflection points at two moments relative to at least one of position information of the detection object and a moving speed of the detection object; and a second calculating unit 202 configured to calculate a similarity between the distributions at the two moments.

In this embodiment, description shall be given by taking that the first calculating unit 201 calculates the distribution of energies of the reflection points at two moments relative to the position information of the detection object and the moving speed of the detection object as an example. While first calculating unit and second calculating unit are illustrated in FIG. 2, the present invention is not limited to a specific number or configuration of software or hardware.

Figure 3:
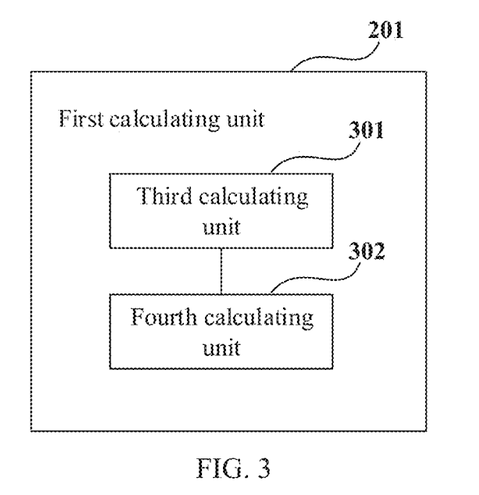
FIG. 3 is a schematic diagram of the first calculating unit according to an embodiment of this disclosure.

FIG. 3 is a schematic diagram of the first calculating unit of Embodiment 1 of this disclosure. As shown in FIG. 3, the first calculating unit 201 includes:

a third calculating unit 301 configured to perform one-dimensional Fourier transform, two-dimensional Fourier transform and angle of arrival estimation on the wireless reflection signals to obtain energies and speeds of the reflection points at the two moments and the distance between the detection object and the wireless signal transmission source; and a fourth calculating unit 302 configured to calculate distribution of energies of the reflection points at the two moments relative to the distance between the detection object and the wireless signal transmission source and the moving speed of the detection object according to the energies and speeds of the reflection points at the two moments and the distance between the detection object and the wireless signal transmission source.

In this embodiment, the third calculating unit 301 may obtain the energy and speeds of the reflection points at the two moments and the distance between the detection object and the wireless signal transmission source through calculation in related methods. And the fourth calculating unit 302 calculates the distribution of the energy of the reflection point at the two moments relative to the distance between the detection object and the wireless signal transmission source and the moving speed of the detection object according to the energy and speeds of the reflection point at the two moments and the distance between the detection object and the wireless signal transmission source.

For example, the fourth calculating unit 302 obtains the distance-Doppler spectrum of the wireless reflection signals according to the calculation result, and calculates the distribution of the energy of the reflection points at the two moments relative to the distance between the detection object and the wireless signal transmission source and the moving speed of the detection object according to the distance-Doppler spectrum. While third calculating unit and fourth calculating unit are illustrated in FIG. 3, the present invention is not limited to a specific number or configuration of software or hardware.

Figure 4:
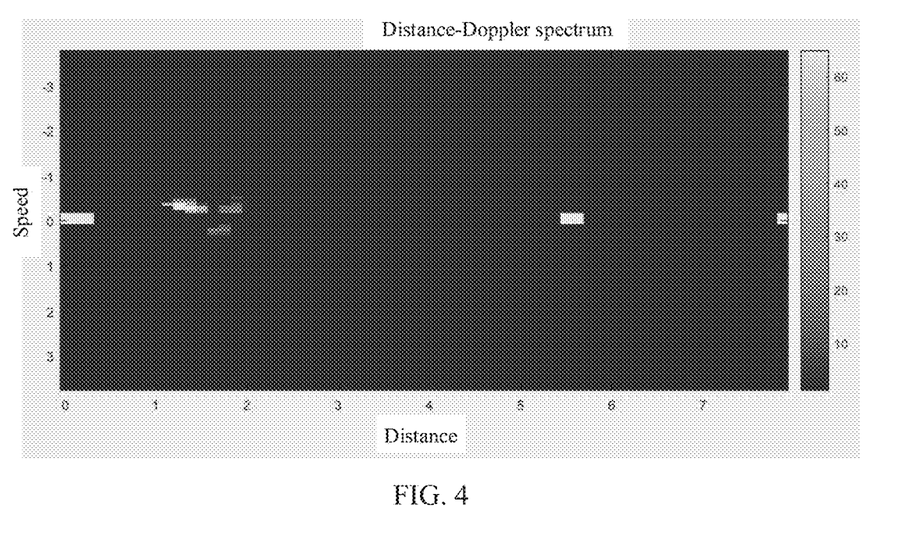
FIG. 4 is a schematic diagram of a distance-Doppler spectrum obtained by calculation according to an embodiment of this disclosure.

FIG. 4 is a schematic diagram of the distance-Doppler spectrum obtained by calculation of Embodiment 1 of this disclosure. As shown in FIG. 4, the abscissa indicates the distance between the detection object and the wireless signal transmission source, the ordinate indicates the moving speed of the detection object, and the color depths of the points indicate signal intensities, i.e. magnitudes of the energies of the reflection point.

Figure 5:
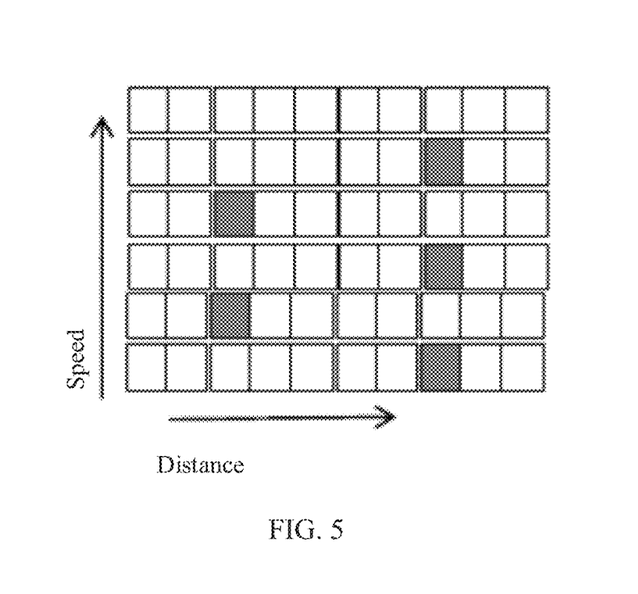
FIG. 5 is a schematic diagram of energy distribution of reflection points according to an embodiment of this disclosure.

FIG. 5 is a schematic diagram of the energy distribution of reflection points of Embodiment 1 of this disclosure. As shown in FIG. 5, according to the distance-Doppler spectrum shown in FIG. 4, the distribution of the energy of the reflection point relative to the distance and the moving speed is determined. The dark squares in FIG. 5 indicate reflection points having energies or reflection points having energies exceeding a preset threshold, and white squares indicate reflection points having energies equal to zero or reflection points having energies less than the preset threshold.

In this embodiment, the distribution of the energy of the reflection points at the first moment relative to the distance and the moving speed may be calculated according to formulae (1) and (2) below:

$$P(x) = \frac{\text{Energy}(x_i)}{\sum_{i=1}^{N} \text{Energy}(x_i)}, \quad (1)$$

$$\text{Energy}(x_i) = \log_{10}\left(\sum_{j=1}^{M} \left(\text{Peak}_{value_j}^2\right)\right); \quad (2)$$

where, P(x) denotes the distribution of the energy of the reflection points at the first moment relative to the distance and the moving speed, i.e. the distribution of the distance-Doppler at the first moment, Energy($x_i$) denotes energy of samples $x_i$, $x_i$=(Range$_i$, Doppler$_i$), i=1, . . . , N, N denoting the number of the samples within the first moment, and Peak_value$_j^2$ denotes an energy value of reflection point in the samples $x_i$, j=1, . . . M, M denoting the number of reflection points in the samples $x_i$, both N and M being positive integers.

Furthermore, the distribution of the energy of the reflection point at the second moment relative to the distance and the moving speed, i.e. the distance-Doppler distribution Q(x) at the second moment, may also be obtained through calculation according to the above formulae (1) and (2).

The method for calculating the distribution of the energies of the reflection point at the two moments relative to at least one of the position information of the detection object and the moving speed of the detection object by the first calculating unit 201 is illustrated above.

In this embodiment, after the first calculating unit 201 calculates the distribution at the two moments, the second calculating unit 202 calculates the similarity between the distributions at the two moments.

In this embodiment, the second calculating unit 202 may calculate the similarity by using various methods.

For example, the second calculating unit 202 calculates the similarity by calculating a Kullback-Leibler divergence (KL divergence) or a Jensen-Shannon divergence (JS divergence). That is, the similarity between the distributions at the two moments may be measured by the KL divergence or the JS divergence.

For example, the second calculating unit 202 may calculate the KL divergence by using formula (3) below:

$$KL(P \| Q) = \sum_{i=1}^{N} P(x_i) \log \frac{P(x_i)}{Q(x_i)}; \quad (3)$$

where, KL(P∥Q) denotes a KL divergence between distribution P(x) and distribution Q (x), P00 denotes $P(x_i)$ when samples are $x_i$, $Q(x_i)$ denotes Q (x) when samples are $x_i$, i=1, . . . , N, N denoting the number of samples within the first moment or second moment, P(x) denotes the distance-Doppler spectrum distribution at the first moment, and Q (x) denotes the distance-Doppler spectrum distribution at the second moment.

For another example, the second calculating unit 202 may calculate the JS divergence by using formula (4) below:

$$JS(P \| Q) = \frac{1}{2} KL\left(P \| \frac{P+Q}{2}\right) + \frac{1}{2} KL\left(Q \| \frac{P+Q}{2}\right); \quad (4)$$

where, JS(P∥Q) denotes a JS divergence between distribution P(x) and distribution Q (x), $$KL\left(P \| \frac{P+Q}{2}\right)$$

denotes a KL divergence between P(x) and $$\frac{P(x)+Q(x)}{2}, KL\left(Q \| \frac{P+Q}{2}\right)$$

denotes a KL divergence between Q (x) and $$\frac{P(x)+Q(x)}{2}, P(x)$$

denotes the distance-Doppler spectrum distribution at the first moment, and Q (x) denotes the distance-Doppler spectrum distribution at the second moment.

In this embodiment, the smaller the value of the KL divergence or the JS divergence, the higher the similarity between the distribution at the two moments.

The method for calculating the variations of the distribution of the energies of the reflection points with time by the calculating unit 101 is illustrated above.

In this embodiment, the determining unit 102 determines the motion state of the detection object according to the variations of energy distribution of the reflection points with time.

For example, the determining unit 102 determines that the detection object is in a stationary state when the variations of energy distribution of reflection points with time satisfy a predetermined condition.

For example, the variations of energy distribution of reflection points with time are denoted by the similarity between the distribution at the two moments, the similarity being measured by the KL divergence or JS divergence of the distribution at the two moments;

For example, when the KL divergence or the JS divergence is less than a first threshold, it shows that the similarity between the distribution of the energies of the reflection points of the detection object at the two moments relative to the distance and moving speed, i.e. the distance-Doppler spectrum distribution, is relatively high, and the determining unit 102 determines that the detection object is in a stationary state at a latter moment, e.g. a current moment; and when the KL divergence or JS divergence is greater than or equal to the first threshold, it shows that the similarity between the distance-Doppler spectrum distribution of the detection object at the two moments is relatively low, and the determining unit 102 determines that the detection object is in a nonstationary state at a latter moment, e.g. a current moment. For example, the nonstationary state may include squat, strenuous turning, or walking, etc.

In this embodiment, a numeral value of the first threshold may be set according to an actual situation.

It can be seen from the above embodiment that the variations of energy distribution of the reflection points with time are calculated according to the wireless reflection signals from the space where the detection object is located, and the motion state of the detection object is determined according to the variations. Thus, the training of the recognition model is not needed, the detection process is simple and detection results are reliable, and are applicable to various different application scenarios.

Embodiment 2

Figure 6:
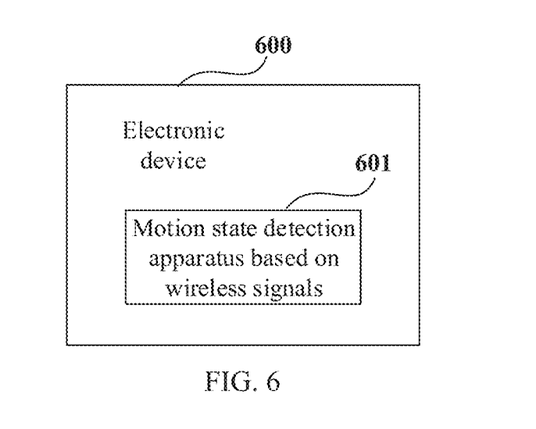
FIG. 6 is a schematic diagram of the electronic device according to an embodiment of this disclosure.

The embodiment of this disclosure provides an electronic device. FIG. 6 is a schematic diagram of the electronic device of Embodiment 2 of this disclosure. As shown in FIG. 6, an electronic device 600 includes a motion state detection apparatus 601 based on wireless signals, a structure and functions of which being identical to those described in Embodiment 1, which shall not be described herein any further.

Figure 7:
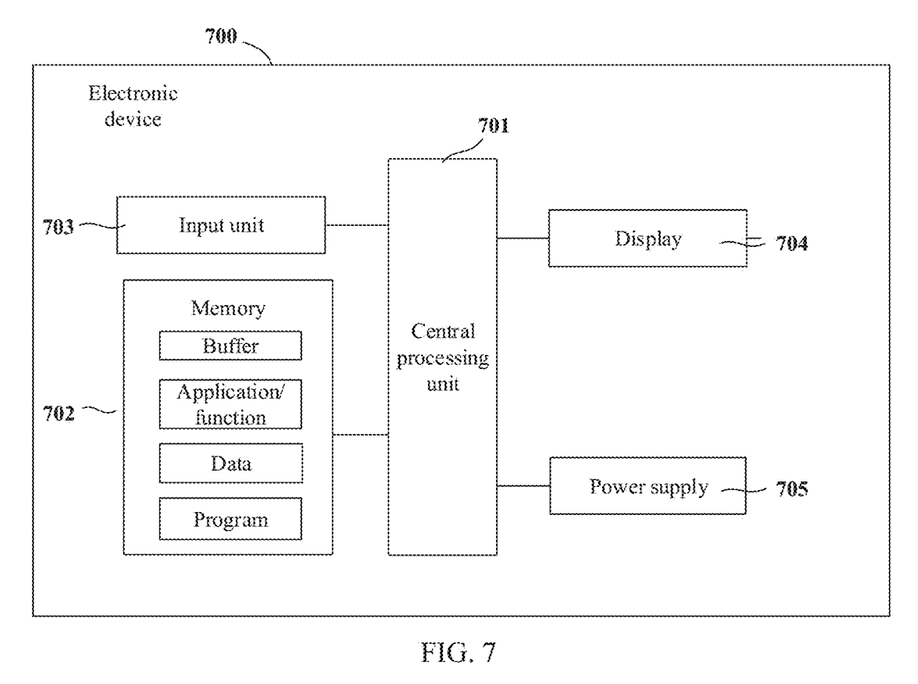
FIG. 7 is a block diagram of a systematic structure of the electronic device according to an embodiment of this disclosure.

FIG. 7 is a block diagram of a systematic structure of the electronic device of Embodiment 2 of this disclosure. As shown in FIG. 7, an electronic device 700 may include a central processing unit 701 and a memory 702, the memory 702 being coupled to the central processing unit 701. It should be noted that his figure is illustrative only, and other types of structures may also be used, so as to supplement or replace this structure and achieve a telecommunications function or other functions.

As shown in FIG. 7, the electronic device 700 may further include an input unit 703, a display 704, and a power supply 705.

In one implementation, the functions of the motion state detection apparatus based on wireless signals described in Embodiment 1 may be integrated into the central processing unit 701. Wherein, the central processing unit 701 may be configured to: calculate variations of energy distribution of reflection points with time according to wireless reflection signals from a space where a detection object is located; and determine a motion state of the detection object according to the variations of energy distribution of reflection points with time.

For example, the calculating variations of energy distribution of reflection points with time according to wireless reflection signals from a space where a detection object is located includes: calculating distribution of energies of the reflection points at two moments relative to at least one of position information of the detection object and a moving speed of the detection object; and calculating a similarity between the distribution at the two moments.

For example, the position information of the detection object includes: a distance between the detection object and a wireless signal transmission source, or coordinates of a position where the detection object is located in a coordinate system established with the wireless signal transmission source as a center.

For example, the calculating distribution of energies of the reflection points at two moments relative to at least one of position information of the detection object and a moving speed of the detection object according to wireless reflection signals from a space where a detection object is located includes: performing one-dimensional Fourier transform, two-dimensional Fourier transform and angle of arrival estimation on the wireless reflection signals to obtain energies and speeds of the reflection points at the two moments and the distance between the detection object and the wireless signal transmission source; and calculating distribution of energies of the reflection points at the two moments relative to the distance between the detection object and the wireless signal transmission source and the moving speed of the detection object according to the energies and speeds of the reflection points at the two moments and the distance between the detection object and the wireless signal transmission source.

For example, the two moments respectively contain the predetermined number of frames.

For example, the detection object is determined as being in a stationary state when the variations of energy distribution of reflection points with time satisfy a predetermined condition.

For example, the variations of energy distribution of reflection points with time may be denoted by the similarity between the distribution at the two moments, the similarity being measured by a KL divergence or a JS divergence of the distribution at the two moments; and when the KL divergence or the JS divergence is less than a first threshold, the detection object is determined as being in a stationary state.

For example, the calculating variations of energy distribution of reflection points with time includes: calculating variations of energy distribution of all reflection points or reflection points with energies greater than a preset threshold with time.

In another implementation, the motion state detection apparatus based on wireless signals described in Embodiment 1 and the central processing unit 701 may be configured separately. For example, the motion state detection apparatus based on wireless signals may be configured as a chip connected to the central processing unit 701, with the functions of the motion state detection apparatus based on wireless signals being carried out under control of the central processing unit 701.

It is not necessary for the electronic device 700 in this embodiment to include all the components shown in FIG. 7.

As shown in FIG. 7, the central processing unit 701 is sometimes referred to as a controller or a control, which may include a microprocessor or other processor devices and/or logic devices, and the central processing unit 701 receives input and controls operations of every component of the electronic device 700.

The memory 702 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 701 may execute programs stored in the memory 702, to realize information storage or processing, etc. Functions of other parts are similar to those of the related art, which shall not be described herein any further. The parts of the electronic device 700 may be realized by specific hardware, firmware, software, or any combination thereof, without departing from the scope of this disclosure.

It can be seen from the above embodiment that the variations of energy distribution of the reflection points with time are calculated according to the wireless reflection signals from the space where the detection object is located, and the motion state of the detection object is determined according to the variations. Thus, the training of the recognition model is not needed, the detection process is simple and detection results are reliable, and are applicable to various different application scenarios.

Embodiment 3

The embodiment of this disclosure provides a motion state detection system, including a signal transmitting portion, a signal receiving portion and a motion state detection apparatus based on wireless signals, a structure and functions of the motion state detection apparatus based on wireless signals being identical to those described in Embodiment 1, which shall not be described herein any further.

Figure 8:
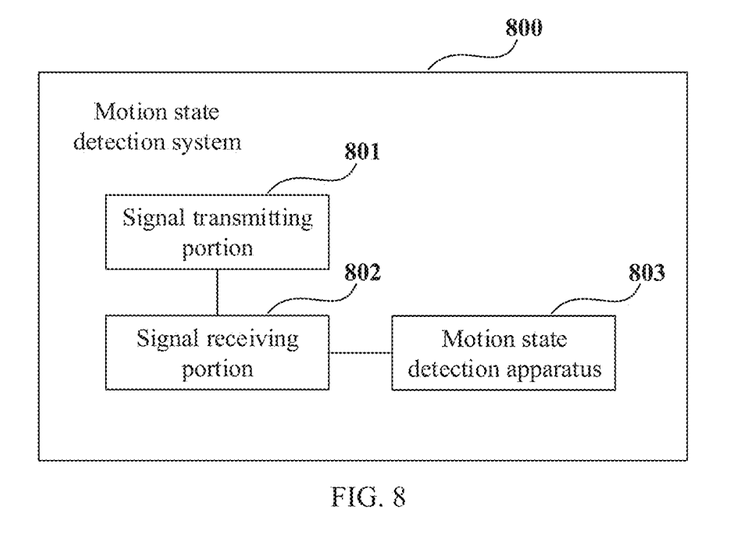
FIG. 8 is a schematic diagram of the motion state detection system according to an embodiment of this disclosure.

FIG. 8 is a schematic diagram of the motion state detection system of Embodiment 3 of this disclosure. As shown in FIG. 8, a motion state detection system 800 includes:

a signal transmitting portion 801 configured to transmit wireless signals to a space where a detection object is located;

a signal receiving portion 802 configured to receive wireless reflection signals; and a motion state detection apparatus 803 configured to detect a motion state of the detection object according to received wireless reflection signals.

In this embodiment, the signal transmitting portion 801 is taken as a wireless signal transmission source, which may be disposed independent of the signal receiving portion 802, or may be integrated therewith. For example, both the signal transmitting portion 801 and the signal receiving portion 802 may be contained in a microwave radar, reference being able to be made to the related art for functions and a structure of the microwave radar.

In this embodiment, functions and a structure of the motion state detection apparatus 803 are identical to those described in Embodiment 1, which shall not be described herein any further. Furthermore, the motion state detection apparatus 803 may be disposed as a stand-alone apparatus, or may be integrated with the signal receiving portion 802 or the microwave radar including the signal receiving portion 802 into an apparatus.

It can be seen from the above embodiment that the variations of energy distribution of the reflection points with time are calculated according to the wireless reflection signals from the space where the detection object is located, and the motion state of the detection object is determined according to the variations. Thus, the training of the recognition model is not needed, the detection process is simple and detection results are reliable, and are applicable to various different application scenarios.

Embodiment 4

The embodiment of this disclosure provides a motion state detection method based on wireless signals, corresponding to the motion state detection apparatus based on wireless signals described in Embodiment 1.

Figure 9:
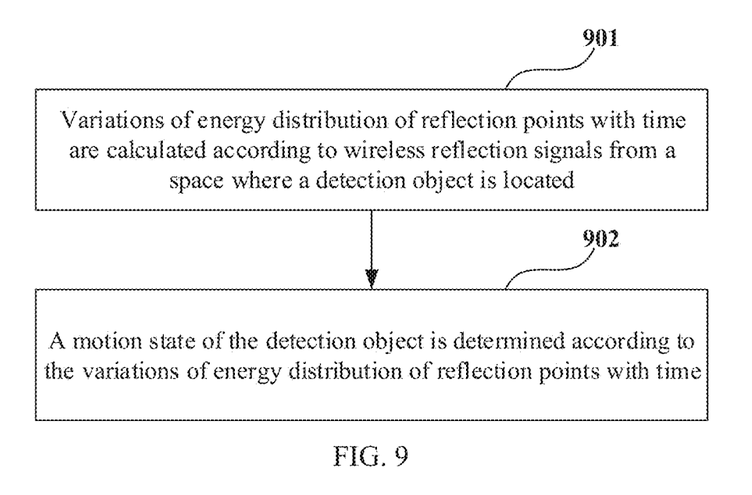
FIG. 9 is a flowchart of the motion state detection method based on wireless signals according to an embodiment of this disclosure.

FIG. 9 is a flowchart of the motion state detection method based on wireless signals of Embodiment 4 of this disclosure. As shown in FIG. 4, the method includes:

Step 901: variations of energy distribution of reflection points with time are calculated according to wireless reflection signals from a space where a detection object is located; and Step 902: a motion state of the detection object is determined according to the variations of energy distribution of reflection points with time.

In this embodiment, particular implementations of the above steps are identical to those described in Embodiment 1, which shall not be described herein any further.

It can be seen from the above embodiment that the variations of energy distribution of the reflection points with time are calculated according to the wireless reflection signals from the space where the detection object is located, and the motion state of the detection object is determined according to the variations. Thus, the training of the recognition model is not needed, the detection process is simple and detection results are reliable, and are applicable to various different application scenarios.

An embodiment of the present disclosure provides a computer readable program, which, when executed in a motion state detection apparatus based on wireless signals or an electronic device, will cause a computer to carry out the motion state detection method based on wireless signals as described in Embodiment 4 in the motion state detection apparatus based on wireless signals or the electronic device.

An embodiment of the present disclosure provides a computer storage medium, including a computer readable program, which will cause a computer to carry out the motion state detection method based on wireless signals as described in Embodiment 4 in a motion state detection apparatus based on wireless signals or an electronic device.

The motion state detection method based on wireless signals carried out in a motion state detection apparatus based on wireless signals or an electronic device described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 9. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively lame capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further provided in this disclosure.

1. A motion state detection method based on wireless signals, the method including:

calculating variations of energy distribution of reflection points with time according to wireless reflection signals from a space where a detection object is located; and determining a motion state of the detection object according to the variations of energy distribution of reflection points with time.

2. The method according to supplement 1, wherein the calculating variations of energy distribution of reflection points with time according to wireless reflection signals from a space where a detection object is located includes:

calculating distribution of energies of the reflection points at two moments relative to at least one of position information of the detection object and a moving speed of the detection object; and calculating a similarity between the distributions at the two moments.

3. The method according to supplement 2, wherein, the position information of the detection object includes: a distance between the detection object and a wireless signal transmission source, or coordinates of a position where the detection object is located in a coordinate system established with the wireless signal transmission source as a center.

4. The method according to supplement 2, wherein the calculating distribution of energies of the reflection points at two moments relative to at least one of position information of the detection object and a moving speed of the detection object includes:

performing one-dimensional Fourier transform, two-dimensional Fourier transform and angle of arrival estimation on the wireless reflection signals to obtain energies and speeds of the reflection points at the two moments and the distance between the detection object and the wireless signal transmission source; and calculating distribution of energies of the reflection points at the two moments relative to the distance between the detection object and the wireless signal transmission source and the moving speed of the detection object according to the energies and speeds of the reflection points at the two moments and the distance between the detection object and the wireless signal transmission source.

5. The method according to supplement 2, wherein, the two moments respectively contain the predetermined number of frames, 6. The method according to supplement 1, wherein, the detection object is determined as being in a stationary state when the variations of energy distribution of reflection points with time satisfy a predetermined condition.

7. The method according to supplement 6, wherein, the variations of energy distribution of reflection points with time are denoted by the similarity between the distribution at the two moments, the similarity being measured by a KL divergence or a JS divergence of the distribution at the two moments;

and when the KL divergence or the JS divergence is less than a first threshold, the detection object is determined as being in a stationary state.

8. The method according to supplement 1, wherein the calculating variations of energy distribution of reflection points with time includes:

calculating variations of energy distribution of all reflection points or reflection points with energies greater than a preset threshold with time.

What is claimed is:

1. A microwave radar system, comprising:
   a signal transmitter configured to transmit wireless signals to a space where an object is located;
   a signal receiver configured to receive wireless signals reflected;
   a memory; and
   a processor coupled to the memory and configured to:
      calculate variations of energy distribution of reflection points with time according to the wireless signals reflected, the wireless signals being microwave radar signals; and
      determine a motion state of the object detected according to the calculated variations of energy distribution of reflection points with time, the motion state comprising a stationary state and a nonstationary state,
   wherein the processor is configured to:
      calculate distribution of energies of the reflection points at two moments relative to at least one of position information of the object and a moving speed of the object, and
      calculate a similarity between distributions at the two moments, which measures the variations of energy distribution of reflection points with time.

2. The microwave radar system according to claim 1, wherein the at least one of position information of the object comprises:
   a distance between the object and a wireless signal transmission source, or coordinates of a position where the object is located in a coordinate system established with the wireless signal transmission source as a center.

3. The microwave radar system according to claim 1, wherein the processor is configured to:
      perform one-dimensional Fourier transform, two-dimensional Fourier transform and angles of arrival estimation on the wireless signals that are reflected to obtain energies and speeds of the reflection points at the two moments and a distance between the object and a wireless signal transmission source, and
   calculate distribution of energies of the reflection points at the two moments relative to the distance between the object and the wireless signal transmission source and the moving speed of the object according to the energies and speeds of the reflection points at the two moments and the distance between the object and the wireless signal transmission source.

4. The microwave radar system according to claim 1, wherein,
   the two moments respectively contain a predetermined number of frames.

5. The microwave radar system according to claim 1, wherein,
   the processor determines that the object is in the stationary state when the variations of energy distribution of reflection points with time satisfy a predetermined condition.

6. The microwave radar system according to claim 5, wherein,
   the variations of energy distribution of reflection points with time are denoted by a similarity between the distributions at the two moments, the similarity being measured by a Kullback-Leibler divergence (KL divergence) or a Jensen-Shannon divergence (JS divergence) of the distribution at the two moments, and
   when the KL divergence or the JS divergence is less than a threshold, the processor determines that the object is in the stationary state.

7. The microwave radar system according to claim 1, wherein,
   the processor calculates variations of energy distribution of all reflection points or reflection points with energies greater than a threshold with time.

8. A method of motion state detection based on wireless signals, the method being applied in a microwave radar system and the method comprising:
   transmitting wireless signals to a space where an object is located;
   receiving wireless signals reflected;
   calculating variations of energy distribution of reflection points with time according to the wireless signals reflected, the wireless signals being microwave radar signals; and
   determining a motion state of the object according to the calculated variations of energy distribution of reflection points with time, the motion state comprising a stationary state and a nonstationary state,
   the calculating variations of energy distribution of reflection points with time according to wireless signals reflected from a space where an object that is detected is located comprises:
      calculating distribution of energies of the reflection points at two moments relative to at least one of position information of the object and a moving speed of the object, and
      calculating a similarity between distributions at the two moments, which measures the variations of energy distribution of reflection points with time.

* * * * *